S. O'HAIRE.
Improvement in Thill-Coupling.
No. 125,982.                          Patented April 23, 1872.
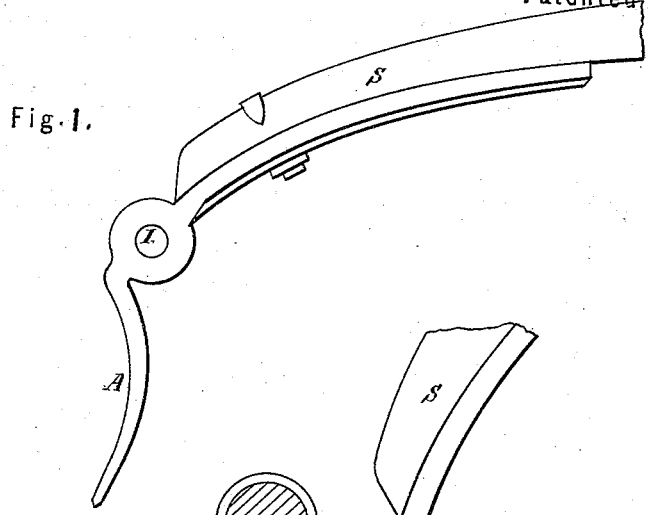
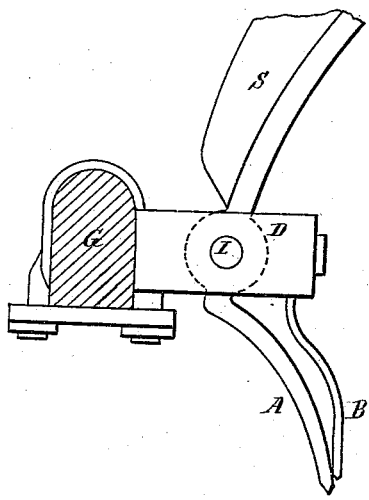
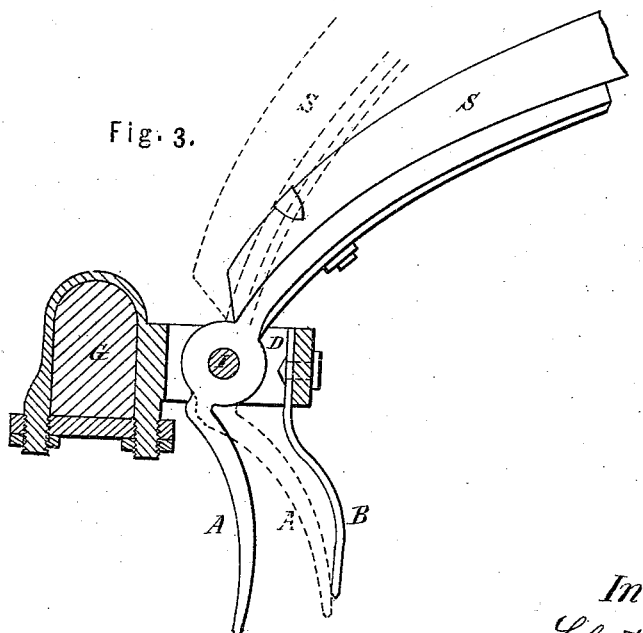
Witnesses
Inventor
Sylvester O'Haire 125,982

UNITED STATES PATENT OFFICE.

SYLVESTER O'HAIRE, OF WEST TROY, NEW YORK, ASSIGNOR TO HIMSELF AND ALEXANDER SHILAND, OF SAME PLACE.

IMPROVEMENT IN THILL-COUPLINGS.

Specification forming part of Letters Patent No. 125,982, dated April 23, 1872.

I, SYLVESTER O'HAIRE, of West Troy, in the county of Albany and State of New York, have invented certain Improvements in Couplings for Thills, of which the following is a specification:

Figure 1 is a side view of the angular extension of the shaft-iron. Fig. 2 is a side view of the shackle with the spring fastened to the front, showing also the angular extension of the shaft-iron in position when the front of the shafts is raised. Fig. 3 shows a transverse section of the shackle with shaft-iron in position when the front of the shafts is dropped.

As represented by A in the drawing, I extend the shaft-iron in an angular direction about two inches beyond the eye through which the bolt passes to connect the parts. B represents the spring connected with the front of the shackle, and I the eye for the bolt. The shackle D is a square or rectangular device, made continuous and connecting with the clip which encircles the axle G. The front of the shackle prevents the thills from falling out while they are raised and connected with the horse, as shown in Fig. 2. In this position the angular extension of the shaft-iron acts as a hook against the front of the shackle D, and even when the bolt is removed the parts cannot be disconnected until the front of the shafts are dropped from the horse to the ground. At the same time the extension A of the shaft-iron acts against the spring B, which is fastened to the front of the shackle, and prevents any play and binds the coupling firmly when the thills are raised to their position and attached to the horse. The end of the thill connected with the shaft-iron is represented by S.

My invention is designed to give greater security and furnish a ready method of connecting and disconnecting thills, and, at the same time, prevent any rattling produced by the play of the parts.

Accidents frequently occur from the imperfect thill-couplings now used, and rubber pads soon wear out, or, losing their elasticity, do not prevent the jar.

I claim—

1. The angular extension of the shaft-iron beyond the eye through which the bolt passes, in combination with the rectangular shackle, for the purpose set forth.

2. I claim the combination of the spring B with the shackle D and the angular extension A of the shaft-iron, for the purpose set forth.

SYLVESTER O'HAIRE.

Witnesses:
   J. H. HOLLANDS,
   JAS. B. MAGUIRE.